Figure 1:
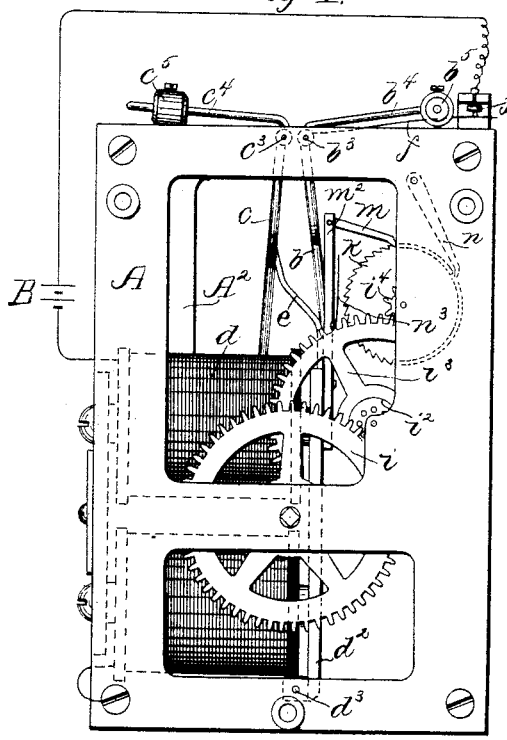

(No Model.)

W. J. DUDLEY.
INDEPENDENT ELECTRIC CLOCK.

No. 447,105. Patented Feb. 24, 1891.

Witnesses.
Jas. J. Maloney.
M. E. Hill.

Inventor.
Walter J. Dudley.
by Jo. P. Livermore
Att'y

UNITED STATES PATENT OFFICE.

WALTER J. DUDLEY, OF EVERETT, MASSACHUSETTS.

INDEPENDENT ELECTRIC CLOCK.

SPECIFICATION forming part of Letters Patent No. 447,105, dated February 24, 1891.

Application filed October 18, 1890. Serial No. 368,592. (No model.)

*To all whom it may concern:*

Be it known that I, WALTER J. DUDLEY, of Everett, county of Middlesex, State of Massachusetts, have invented an Improvement in Electric Clocks, of which the following description, in connection with the accompanying drawings, is a specification, like letters on the drawings representing like parts.

My invention relates to an electric clock of that class in which the time is measured by the beats of a pendulum or balance having a definite time of oscillation, while the hands of the indicating parts of the clock are moved by an electro-magnet, which also is employed to actuate an impelling device that imparts to the pendulum or balance an impulse sufficient to counteract the resistance to its vibratory movement, so as to maintain it in vibration.

The present invention is shown embodied in a clock having a pendulum to measure the time and a gravitating impelling device; and the invention consists, mainly, in details of construction of the impelling device and means for supporting it when raised or set by the electro-magnet and for disengaging it from its support, so that its weight is applied to the pendulum to give it the impulse, and to the means for controlling the circuit of the electro-magnet by which the impelling device is raised or set after the impulse has been given by it preparatory for giving the next impulse.

The devices co-operating with the pendulum comprise two levers pivoted near the point of support of the pendulum about which it oscillates, and each having a projection that engages with one side of the pendulum-rod, these devices resembling in their relation to the pendulum-rod the crutch commonly used in spring or weight driven clocks, except that each engages the pendulum-rod at one side only. Both of the pivoted levers are weighted, so as to cause a projection carried by them to bear against the pendulum-rod, tending to give an impulse to the same; but one of them bears against the rod both as the latter moves toward and from it, so that its effect, so far as impelling the rod is concerned, is nothing. The other of said levers constitutes the impelling device, and it is raised independently of the pendulum and while disengaged therefrom, and is in engagement with the pendulum only while the latter is moving away from it, so that the force of gravity on the impelling device is added as an impulse to the pendulum and is sufficient to counteract the resistances to the movement of the pendulum, so as to maintain it in substantially uniform oscillation. The first-mentioned lever which engages with the pendulum, both in the rising and falling movement, operates the circuit-closer for an electro-magnet, the armature of which raises the impelling device, and said first-mentioned or circuit-controlling lever also co-operates with a detent for the impelling device which holds the latter while the pendulum is completing its vibration away from it after the impulse has been given and while the pendulum is making practically its whole vibration toward the said impelling device, at the end of which the said detent is disengaged by the conjoint action of the pendulum-rod and the circuit-closing lever at the other side thereof. The impelling-lever and the circuit-closing lever both accompany the pendulum-rod about to the middle point of its oscillation and are there arrested, so that the pendulum-rod co-operates with one of the pivoted levers while at one side of the middle point of its oscillation and with the other while at the other side of its middle point of oscillation.

Figure 2:
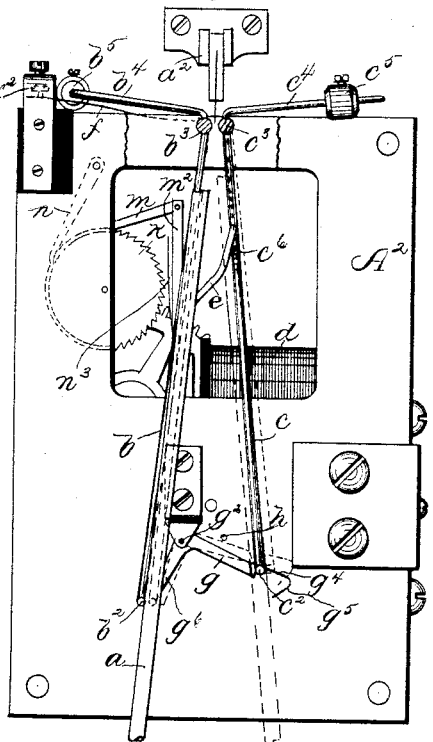
Figure 3:
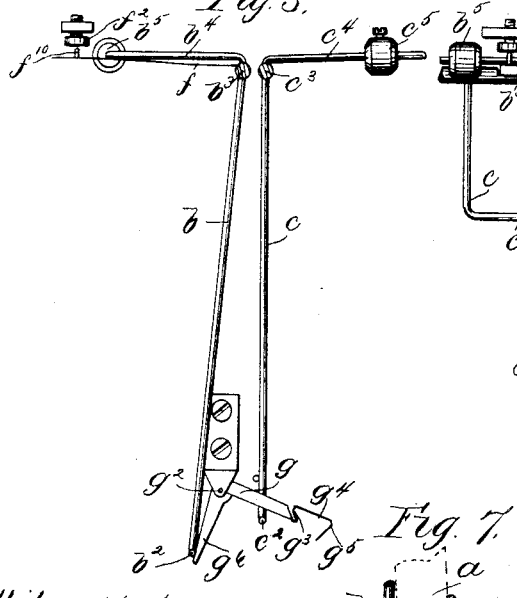
Figure 4:
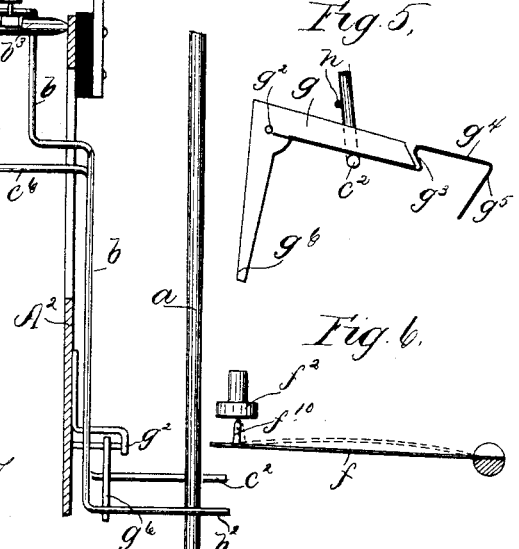
Figure 5:
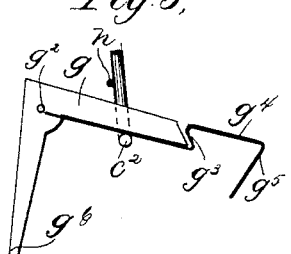
Figure 6:
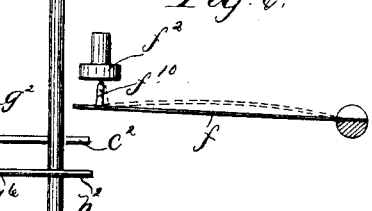

Figure 1 is a front elevation of the operative parts of an electric clock embodying this invention, the face and hands of the clock and gearing immediately connected with said hands being removed; Fig. 2, a rear elevation thereof, showing the parts in full lines in position occupied when the pendulum is near one end of the stroke and in dotted lines in the position occupied when the pendulum is near the other end of the stroke; Figs. 3 and 4, rear and side elevations, respectively, of the pendulum-rod and parts co-operating therewith; Fig. 5, a detail showing the detent-lever; Fig. 6, a detail showing the circuit-closer, and Fig. 7 a modification of the detent.

The rod $a$ for the pendulum, which latter is not shown, may be hung to oscillate about a support at $a^2$ in the usual manner, the said rod being between projecting fingers $b^2$ and $c^2$ of levers $b$ and $c$, pivoted at $b^3$ and $c^3$ near the point of oscillation of the pendulum, said levers each supported on a rock-shaft having its bearings in the main frame-plates A $A^2$, that support the working part of the clock-movement. The term "pendulum" is intended to include any time-measuring vibrator. The said levers $b$ and $c$ are bent, having lateral arms $b^4$ and $c^4$, provided with weights $b^5$ and $c^5$, which tend to turn them on their pivots in such direction as to move the pendulum-engaging projections $b^2$ $c^2$ toward the pendulum-rod. The lever $c$, with its weight $c^5$ constitutes the impelling device, and the lever $b$ operates the circuit-closer for the magnet $d$, by which the impelling device is raised, and will be hereinafter called the "circuit-closing lever," although it performs other functions which will be hereinafter explained.

The circuit-closing lever B operates a contact-spring $f$, constituting one member of a circuit-closer, the other member $f^2$ of which is supported on an insulated bracket, said members controlling the circuit of the actuating electro-magnet $d$, which is indicated in diagram, Fig. 1, and includes the battery B, by which the said magnet is energized. The pivoted portions $b^3$ $c^3$ of the levers $b$ $c$ are rock-shafts having their bearings in the frame-plates A $A^2$, and the contact-spring $f$ of the circuit-closer has one end rigidly secured to the rock-shaft $b^3$ of the lever $b$, so that the said spring turns around the fulcrum of the said lever when the latter is itself turned with said rock-shaft as its pivot portion. When the pendulum-rod nears the end of its stroke toward the full-line position, Fig. 2, it turns the lever $b$ on its pivot, so as to press the spring $f$ against the contact $f^2$, thereby closing the circuit of the magnet $d$, which is energized and attracts its armature $d^2$, which is pivoted at $d^3$ in such position that it is retracted by the force of gravity acting on the said armature and parts connected with it. The said armature is provided with an arm $e$, which engages with a horizontal portion $c^6$ of the impelling-lever $c$ and acts on the same in the direction to turn the said impelling-lever so as to raise the weight $c^5$, at the same time moving the projections $c^2$ outward from the middle point in the beat of the pendulum. When the impelling device is so raised by the action of the magnet and armature, it is engaged by a detent device shown in Figs. 2, 3, and 5 as a bent lever $g$, pivoted at $g^2$ and provided with a shoulder $g^3$, which engages the pin $c^2$ and supports the same against the action of the weight $c^5$, tending to turn it toward the pendulum-rod. The shoulder $g^3$ is made on a piece of light spring-steel $g^4$, connected with the lever $g$ and provided with a second deeper shoulder $g^5$, which limits the outward movement of the pin $c^2$, preventing the same from being thrown too far by the sudden impulses of the armature, such construction of the shoulders $g^3$ and $g^5$ insuring the engagement of the impelling-lever by the detent when the impelling-lever is restored by the armature. This restoring operation takes place when the pendulum-rod is in the portion of its stroke remote from the projection $c^2$, as it is only at this time that the circuit-closer $f f^2$ is closed.

With the parts in the position shown in full lines, Fig. 2, the lever $b$ rests with its projection $b^2$ against the side of the pendulum-rod both while the pendulum is moving, so as to close the contacts $f f^2$, and while the pendulum is making the first part of its return movement, the weight $b^5$ and force of the spring $f$ tending to accelerate the pendulum as much in its return movement as they tended to retard it in the forward movement, and the projection $b^2$ follows the pendulum in its return movement until the said projection brings up against the trip-arm $g^6$ of the detent-lever $g$, after which the pendulum continues its movement toward the dotted-line position independently of the lever $b$.

With the arrangement and adjustment illustrated in Figs. 1 to 5 the pressure of the lever $b$ against the projection $g^6$ is not sufficient to disengage the shoulder $g^3$ from the pin $c^2$ as long as the said pin presses against said shoulder by the force of gravity on the weight $c^5$; but when the pendulum-rod $a$ nears the end of its vibration toward the dotted-line position it engages the projection $c^2$, moving it from the shoulder $g^3$, under which conditions the weight $b^5$, acting through the lever $b$ on the arm $g^6$, overbalances the other arm, and the lever $g$ lifts it until arrested by a stop projection $h$, as shown in dotted lines, with the shoulder $g^3$ above the path of movement of the pin $c^2$, so that the latter is now supported wholly by the pendulum-rod and transmits the impulse from the weight $c^5$ to the pendulum-rod, following the same in its next beat from the dotted toward the full line position until the lever $c$ brings up against the stop $h$, after which the pendulum, continuing its forward movement, again engages the projection $b^2$ and moves the lever $b$, permitting the detent $g$ to drop and rest upon the projection $c^2$, (see Fig. 5,) after which the circuit of the magnet is closed at $f f^2$, the magnet energized, and the impelling-lever $c$ restored or set back to its original normal position and engaged by the detent-lever $g$. In this manner the pendulum is retained in vibration as long as the battery energizes the magnet sufficiently to raise the impelling-lever. The time thus measured by the beats of the pendulum may be indicated by a clock dial and hands in any usual manner, the said hands being turned by a train of wheel-work $i$ $i^2$ $i^3$ $i^4$, the shaft of which latter wheel is provided with a ratchet-wheel $k$, engaged by a pawl $m$, carried by an arm $m^2$, connected with the armature $d^2$ of the magnet $d$, said pawl advancing the ratchet for the space of one tooth at each backward movement of the armature and being drawn forward to engage the next tooth at the forward movement of the armature. A retaining-pawl $n$ prevents backward rotation of the ratchet when the pawl is being moved to engage a new tooth.

The working parts of the clock mechanism are moved by comparatively feeble forces, depending for some of the operations upon the force of gravity acting on pieces of comparatively light weight, and much difficulty has been experienced in practical operation of clocks of this general character, which I have discovered is owing to adhesion of parts that engage with one another. This difficulty has been overcome in the present apparatus by a peculiar construction of the engaging parts, as illustrated by the shoulder $g^3$ of the detent $g$, that engages the pin $c^2$. By making the said shoulder of a piece of spring-steel (see Fig. 5) bent to form the surfaces $g^3$ and $g^5$, that co-operate with the projection $c^2$, I have found that there is no tendency to develop adhesion between the contacting surfaces in a long period of operation. The pawl-carrying arm $m^2$ of the armature is also provided with a light piece of spring-steel, as shown at $n^3$, which in the retractive movement of the armature engages with the periphery of the ratchet-wheel $k$, and thus limits the said movement to what is just sufficient to turn the wheel $k$ for the space of one tooth, the said spring cushioning the movement of the armature while applying a slight friction to the wheel, so as to prevent it from being thrown too far by the pawl or advanced more than one tooth at each stroke of the armature, and such construction also effectually preventing any development of adhesion at the points of contact with the wheel, as would arise if the rigid pawl-carrying arm $m^2$ engaged with the wheel without intervention of the said cushioning-spring.

The circuit-closing contacts are adjusted in such manner as to afford an efficient electrical connection without any rubbing, since if there be the slightest rubbing or frictional movement of one contact upon the other the contacts will soon wear out. In order to accomplish this result, the contact-carrying spring $f$ is provided with a contact projection $f^{10}$, (see Fig. 6,) which is sharpened or pointed at its contact end, so as to engage with the flat faces of the contact member $f^2$. The length of the contact projection $f^{10}$ is proportioned to the length of the spring $f$ in such manner that when the point of the projection $f^{10}$ engages the flat face of the member $f^2$ the further movement or increased pressure of the spring $f$ will change the angle of the portion of the spring $f$ that carries the contact $f^{10}$, and at the same time will wind the spring slightly or draw the base of the projection toward the rock-shaft to which the spring $f$ is connected in such manner that the movement of the contact $f^{10}$ will be solely a rocking movement at its point on the flat surface of the member $f$, such action being illustrated, but greatly exaggerated, by the full and dotted line position of the spring and contact in Fig. 6, the full lines showing the parts in the position occupied when the contact $f^{10}$ just reaches and engages the surface of the other member, while the dotted lines show the position after the spring has been strained considerably farther, and thus increased the pressure between the contacts without, however, producing any rubbing friction whatever between them.

While the adjustment and arrangement of the parts herein described are believed to be the best for securing the most accurate measurement of time, such arrangement and adjustment can be varied considerably without departing from the essential features of construction and operation of the devices co-operating with the pendulum. For example, the arm or lever $b$, which has been referred to as the "circuit-closing lever," and which is also the detent-disengaging lever, might be so weighted as to positively disengage the detent that supports the impelling-lever $c$ without requiring that the said impelling-lever should be raised by the pendulum-rod, as has been heretofore described.

Figure 7:
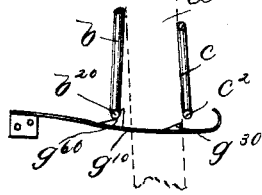

The adjustment in which the disengaging-arm $b$ presses against the detent only enough to raise the said detent after the impelling-arm has been moved from the detent-shoulder by the action of the pendulum may be somewhat too delicate, and by having the disengaging-arm somewhat heavier it would disengage the detent without the additional action of the pendulum-rod on the impelling-arm. Such construction, in connection with a modification in the form of the detent, is illustrated in Fig. 7, in which the detent-engaging shoulder $g^{30}$ is carried by a spring $g^{10}$ instead of by a pivoted arm, and said detent-spring is disengaged by a projection $b^{20}$ of the arm $b$, acting upon a cam or wedge $g^{60}$ on the detent-spring in such manner that when the arm $b$ is permitted to descend, while following the movement of the pendulum toward the impelling-arm, it engages the said wedge $g^{60}$ and bends the detent-spring $g^{10}$ sufficiently to disengage the shoulder $g^{30}$ from the impelling-arm $c$. This illustrates merely one of the various modifications of the combination in which an impelling-arm operated by an electro-magnet is controlled by a detent which in turn is controlled or operated by a second arm pivoted independently of the impelling-arm and disconnected from but engaged by the pendulum-rod, the said second arm preferably but not necessarily being also the part that operates the circuit-closer for the electro-magnet that actuates the impelling-arm. It is important that the two arms should be pivoted near the point about which the pendulum oscillates, as by this arrangement they press against the pendulum-rod without having sliding friction thereon, which latter is an uncertain element and likely to be detrimental to the time-keeping properties of the clock.

I claim—

1. The combination of the time-measuring vibrator with the impelling-lever and its restoring electro-magnet and armature, a detent for supporting said impelling-lever after being raised and released by said magnet, and the second lever pivoted independently of said impelling-lever and co-operating with said detent, substantially as described.

2. The combination of the pendulum-impelling device and actuating electro-magnet therefor with the circuit-closing lever fulcrumed near the point of oscillation of the pendulum and provided with a projection to be engaged by the pendulum-rod, and a spring-arm connected with said lever constituting one member of the circuit-closer in the circuit of said electro-magnet, substantially as described.

3. The combination of the impelling-lever with the electro-magnet and armature provided with an arm for engaging said lever and the detent having a spring engaging portion with a shoulder to engage said impelling-lever when set by the electro-magnet, substantially as described.

4. The combination of the time-measuring vibrator with an electro-magnet and circuit-closer therefor operated by said vibrator, the train of wheel-work and the actuating ratchet-wheel thereof, the armature for said electro-magnet, provided with a pawl for engaging the teeth of said ratchet, and a cushioning-spring that engages the periphery of said ratchet-wheel to limit the ratchet-actuating movement of the armature, substantially as described.

5. The combination of the time-measuring vibrator with the circuit-closing lever engaged and operated thereby, a spring-arm connected therewith provided with a laterally-projecting contact-piece, and a co-operating stationary contact-piece engaged thereby, the said laterally-projecting contact and spring being proportioned to one another, as set forth, whereby the contact rocks without sliding on the co-operating contact-surface as the tension of the spring varies, substantially as described.

6. The combination of the pendulum with an impelling-lever and a circuit-closing lever, each pivoted independently of the other near the point of oscillation of the pendulum, an electro-magnet co-operating with the said impelling-lever, and a detent for the lock, which latter is engaged and operated by the circuit-closing lever, substantially as described.

In testimony whereof I have signed my name to this specification in the presence of two subscribing witnesses.

WALTER J. DUDLEY.

Witnesses:
 JOS. P. LIVERMORE,
 JAS. J. MALONEY.